UNITED STATES PATENT OFFICE.

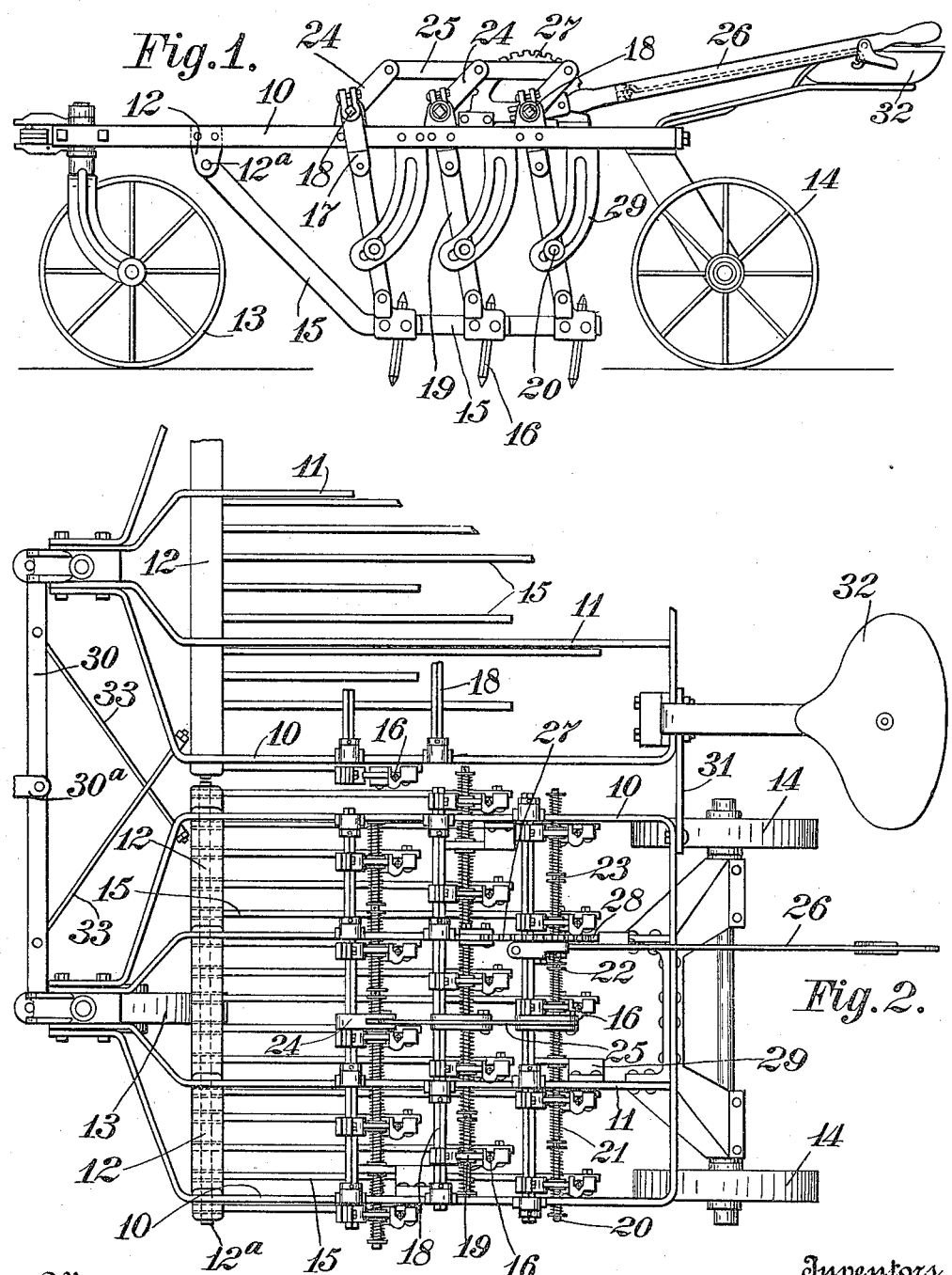

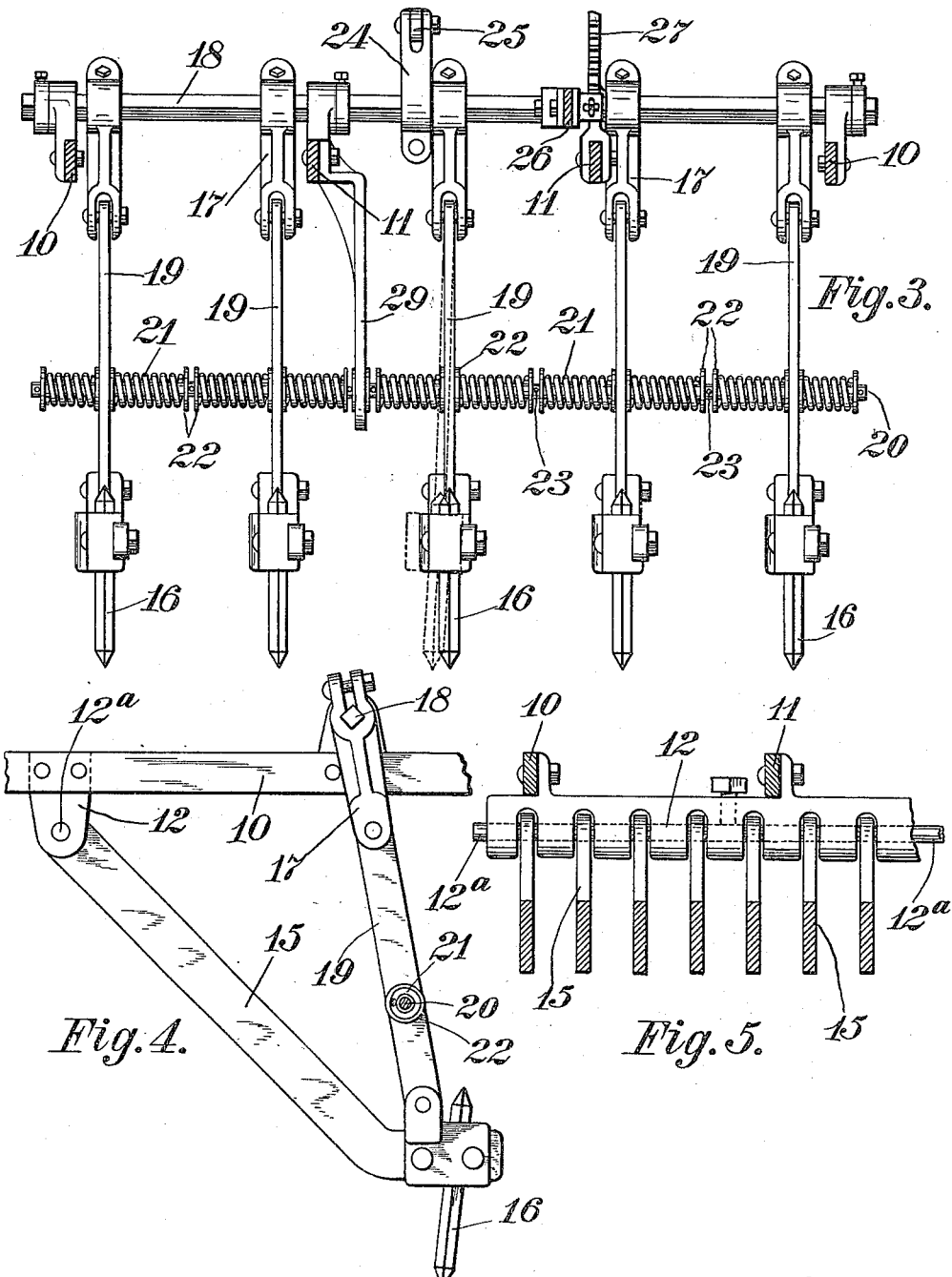

CLIFFORD H. PIDGEON AND JOHN R. M. BOYD, OF COLUMBUS, OHIO; SAID BOYD ASSIGNOR TO SAID PIDGEON.

CULTIVATOR.

1,159,532.   Specification of Letters Patent.   Patented Nov. 9, 1915.

Application filed December 14, 1914. Serial No. 877,006.

*To all whom it may concern:*

Be it known that we, CLIFFORD H. PIDGEON and JOHN R. M. BOYD, citizens of the United States, residing at Columbus, in the county of Franklin and State of Ohio, have invented a certain new and useful Improvement in Cultivators, of which the following is a specification.

For its thrifty growth it has been found that alfalfa needs cultivation several times during the year; but attempted cultivation with the means heretofore employed has resulted in much damage to many of the fields. The reason is that alfalfa is sown quite thickly and its root develops a large crown so that the ordinary teeth of the harrow or cultivator drawn across the field lacerates the crowns of the root and permits the setting up of a decay therein that eventually extends to the entire root resulting in the destruction of the plant. Alfalfa, therefore, is best cultivated by means which stir the soil between the crowns and roots of adjacent plants without cutting through them.

The object of the present invention is to provide an improved construction of cultivator whereby alfalfa can be successfully cultivated in the manner stated and with a minimum of injury to the plants.

The invention is embodied in the example herein shown and described and then claimed at the end of the description.

In the accompanying drawings—Figure 1 is a view in side elevation of the cultivator according to our invention. Fig. 2 is a plan view of one cultivator unit showing how it may be connected to another to make a pair, parts being omitted. Fig. 3 is a detail in rear view on a larger scale. Fig. 4 is a detail in side view of the tooth hanger. Fig. 5 is a detail of the draw bar.

The structure includes a main carrying frame of rectangular form, generally, made up of metallic bars such as at 10 and 11, and a horizontal drawbar 12, suitably secured together. This frame is supported at its forward end upon a swiveled carrying wheel 13 and at its rear upon two wheels 14, 14. Hingedly hung upon a long pin 12ª between ears on the drawbar 12 is a series of drag bars 15 in the lower ends of which are secured and carried the cultivating teeth 16. The drag bars 15 are made of three different lengths and are hung to the horizontal drawbar 12 so that the teeth occur in three rows transversely, but the teeth of the several rows occur in zig-zag arrangement with no two teeth occurring in the same line lengthwise of the cultivator. Each tooth therefore works in the soil in a line generally speaking different from the others but each tooth by reason of the single loose drawing connection shown is capable of shifting practically directly to the right or left while being drawn. The teeth are best mounted so as to incline slightly forward at their lower ends when in working position. Each tooth and its holder in each of the transverse rows of teeth is supported by means of a rocker arm 17, secured on a bar 18, and a link 19 connecting the rocker arm with the tooth holder. The connection of the link 19 with the rocker arm 17 is also, as shown, such as to permit direct lateral play. The bar 18 is square in cross section and the rocker arms have corresponding clips to engage the bar so as to prevent said arms from turning thereon, and said bar is suitably journaled in the main carrying frame. The links 19 in each transverse row of teeth are connected by a bar 20 that extends loosely through holes in the links; and upon this bar on each side of each link are placed coiled springs 21 tending to hold the link and, therefore, the tooth in a given or normal position but permit a deflection or sidewise movement in either direction should the tooth meet an obstructing object adapted to permit lateral deflection in one direction or the other. Washers, as at 22, can be provided for abutment of the ends of the springs and the springs between the different links relieved of action upon each other by a pin 23 or other device in or on the bar 20.

The several bars 18 are shown as each provided with a crank arm 24 connected by a common bar 25 so that the operation of one of the bars 18 shall cause a corresponding operation of the others. For this purpose the rear-most bar 18 is shown to be provided with a hand lever 26, said lever working adjacent a stationary tooth sector 27, and said hand lever 26 carrying an ordinary spring actuated tooth 28 to engage the sector and usual means on the lever 26 to withdraw the same when that lever is to be turned to move the crank arms, or rock levers and cultivator teeth to elevated or lowered and operative position.

In the place of certain of the pins 23 curved slotted guide members 29 secured to the frame bars 10 and 11 can be provided. The bars 20 extend through the slots of these guide members 29 and serve to brace the parts and prevent possible twisting.

The cultivating tooth 16 is made of any suitable form but preferably so as to present a rather blunt advancing edge or face with sides inclined therefrom so as to have a tendency to be deflected when it strikes the root or crown of an alfalfa plant. The cultivating teeth when lowered to operative position in the construction as herein described have no vertical motion but only a lateral motion to either side of a normal, such as may be occasioned by a tooth striking an alfalfa crown.

In the lower portion of Fig. 2 is illustrated one operative unit. Such a unit can be added to by coupling similar units to it. Enough of a second unit is illustrated in said Fig. 2 to show how the coupling can be effected. At the forward end the tongues of the two units can be connected by means of a bar 30 having a tongue attachment 30ᵃ while at the rear end a bar 31 can be employed. The connections of the bar 30 with the tongues should be made loose and the connections of the bar 31 should be hinging so that the two units swing to move at an angle to each other as where the coupled units are drawn over slight elevations or depressions in the ground and thus evenly cultivate the soil upon the inclined sides of such elevations or depressions. A seat 32 affixed to the main frame can be provided for the driver upon either of said units or upon one of them in a similar manner if one unit only is used.

Tension rods 33 connected with each end of the bar 30 and extending to and connected respectively with the opposite cultivator unit can be employed to further tie the units together and prevent one unit from being drawn in advance of the other should the forward movement of one unit be obstructed as by a tree stump, heavy stone or other thing.

The forms of the parts can be changed without departing from the gist of the invention as claimed.

What we claim is:

1. In a cultivator of the kind described, the combination of a frame, a transverse row of cultivator teeth each having laterally movable supporting means, a bar extending transversely of the cultivator through said supporting means, a pair of springs on said bar between the adjacent supporting means to hold the teeth in normal working position, and means between the members of said pair of springs to take endwise pressure of one spring independently of the other.

2. In a cultivator of the kind described, the combination with a frame, of a transverse row of laterally movable supports for cultivator teeth, a rod extending transversely of the cultivator, and a pair of springs between supports to hold the teeth in normal working position and abutments on said rod between the springs to prevent endwise compression of one spring against the other.

3. In a cultivator of the kind described, the combination with a frame, of a transverse row of laterally movable supports for cultivator teeth, a rod connecting said supports, said supports being freely movable on said rod, and a pair of springs on said rod between adjacent supports to hold the teeth in normal working position and vertical guiding means on the frame for said rod, said guiding means extending between the members of the pairs of springs of adjacent supports.

4. In a cultivator of the kind described, a transverse series of laterally movable supports for cultivator teeth, a pair of springs, said springs being in line and end to end with each other between the adjacent supports and each spring bearing at one end against a support to hold the teeth in normal working position, and rigid abutments between the other ends of the members of the pairs of springs to prevent endwise compression of one spring against the other.

CLIFFORD H. PIDGEON.
JOHN R. M. BOYD.

Witnesses:
C. E. WESTERVELT,
HARRY REDDING.

Copies of this patent may be obtained for five cents each, by addressing the "Commissioner of Patents, Washington, D. C."